United States Patent Office 3,342,679
Patented Sept. 19, 1967

3,342,679
METHODS FOR THE CONTROL OF CONVULSIVE SEIZURES
Marvin Paulshock, Wilmington, Del., assignor to E. I. du Pont de Nemours and Company, Wilmington, Del., a corporation of Delaware
No Drawing. Original application Mar. 15, 1962, Ser. No. 180,000. Divided and this application June 9, 1964, Ser. No. 373,880
8 Claims. (Cl. 167—65)

This application is a divisional application of Serial No. 180,000, filed March 15, 1962, which is in turn a continuation-in-part application of Serial No. 18,476, filed March 30, 1960, and application Serial No. 22,398, filed April 15, 1960, all of which are abandoned.

This invention relates to benzamides and their use as anticonvulsants.

It is more particularly directed to the use, as anticonvulsants, of compounds of the formula (1) 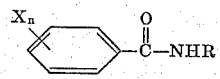

where

X is hydrogen, fluorine, chlorine, bromine or combinations of these;
R is hydrogen, a primary or secondary alkyl radical containing from 1 to 5 carbon atoms, a primary or secondary hydroxyalkyl radical containing from 1 to 5 carbon atoms, a primary or secondary alkoxyalkyl radical containing a total of from 2 to 5 carbon atoms, or a —Z—$NR_1R_2$ radical where
  Z is an alkylene radical containing from 1 to 4 carbon atoms,
  $R_1$ and $R_2$ are hydrogen or an alkyl radical containing from 1 to 4 carbon atoms, with the proviso that $R_1$ and $R_2$ can be joined together to form, with the nitrogen atom, a pyrrolidine, morpholine, piperidine, or piperazine ring, and
n is 1, 2, 3, 4 or 5.

Within this scope are a group of compounds which are novel. These compounds are of the formula (2) 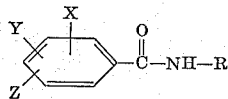

where

X, Y and Z are fluorine or chlorine; and
R is a primary or secondary alkyl radical containing from 1 to 5 carbon atoms, a primary or secondary hydroxyalkyl radical containing 2–5 carbon atoms, a primary or secondary alkoxyalkyl radical containing a total of 2–5 carbon atoms, or a —T—$NR_1R_2$ radical where
  T is an alkylene radical containing from 1–4 carbon atoms, and
  $R_1$ and $R_2$ are hydrogen or an alkyl radical containing from 1–4 carbon atoms, with the proviso that $R_1$ and $R_2$ can be joined together to form, with the nitrogen atom, a pyrrolidine, morpholine, piperidine, or piperazine ring.

Preferred for use according to this invention are compounds of the formula (3) 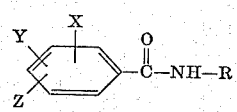

where

X, Y and Z are chlorine or bromine; and
R is a primary or secondary alkyl, hydroxyalkyl or alkoxyalkyl having 3 to 4 carbon atoms.

Particularly preferred because of their high therapeutic ratio and efficacy are:

2,3,6-trichloro-N-propylbenzamide
2,3,6-trichloro-N-butylbenzamide
2,3,6-trichloro-N-(2-hydroxypropyl)benzamide
2,3,5-trichloro-N-propylbenzamide
2,4,6-trichloro-N-propylbenzamide
2,3,5-trichloro-N-(2-dimethylaminoethyl)benzamide It has been found that these compounds, when administered to warm-blooded animals in a suitable manner and at a proper dosage, will prevent or substantially reduce the frequency of occurrence and severity of epileptic seizures.

Other types of convulsive seizures, such as those associated with neurosurgery, brain damage, hyperventilation, and fever and those induced by electroshock and "metrazol" (pentamethylenetetrazol) are effectively controlled with these compounds. They can also be used for the emergency treatment of convulsive seizures. This control is achieved with a minimum of side effects such as are commonly associated with the use of anticonvulsant drugs.

These compounds are especially advantageous because the duration of their effect is quite long. This permits longer intervals between doses, with no reduction in effectiveness.

For general use, the compounds of Formula 1 are preferably administered orally. For emergency treatment, however, parenteral administration is preferred.

The amounts of the compounds of Formula 1 which are to be administered will depend on the age and weight of the warm-blooded animal recipient, the degree of severity of the seizures, and the magnitude of effect desired. Larger doses will, of course, be required for emergency treatment. Generally, the compounds of this invention should be administered in doses of 50 to 1000 milligrams daily. The amounts can be given in single or multiple doses, as required. If administered orally, the compounds can be given in 50 to 250 milligram doses at spaced intervals throughout the day.

It should be understood that the dosage can also be varied if the seizures are being concurrently treated by some other method. The particular dosage for any given situation will be apparent to one skilled in the art.

The compounds of Formula 1 can be administered as such, or can be administered in the form of a composition comprising the active ingredient and any of the commonly used pharmaceutical carriers. These carriers must be compatible with the active ingredient, and can be either solid or liquid, therapeutically active or inert.

By using such carriers, one can make these compositions in the form of tablets, capsules, powders, oral suspensions, or syrups. The compositions can also be made in the form of sterile solutions which are suitable for injection.

The compositions will contain from 1% to 95% by weight of active compound, and from 5% to 99% by weight of a suitable pharmaceutical carrier. These ranges, however, are not critical and can be varied as desired according to the circumstances.

A sterile solution suitable for injection is prepared by admixing from 0.5 to 5 parts by weight of the active ingredient and from 95 to 99.5 parts by weight of water or isotonic saline solution at a temperature and for a time sufficient to dissolve the active ingredient. This solution is then sterilized by filtration or by the application of heat. The solution is preferably sterilized in an autoclave at a steam pressure of 15 pounds per square inch for from 5 to 15 minutes. A preferred solution for injection also contains preservatives such as a mixture of methyl- and propylparaben, benzoic acid, or other nontoxic antimicrobial agents.

These injectable solutions can be prepared with a high concentration of active ingredient. The solution is then diluted to a desired concentration before it is used.

A preferred solution suitable for injection contains 5% by weight of a compound of Formula 1, 0.1% methylparaben, U.S.P. as a preservative, and about 95% isotonic sodium chloride solution. An intravenous injection of about 1–5 milliliters will control convulsive seizures in *status epilepticus.*

The compounds of Formula 1 can also be administered in the form of hard or soft gelatin capsules. These capsules are filled with the proper amount of active ingredient and a solid filler, such as starch, gelatin, lactose, talc, stearic acid, or magnesium stearate. Such a capsule can contain from 50 to 250 milligrams of active material, thus providing a minimum dose of active ingredient in a form convenient for oral administration.

The compounds of Formula 1, when mixed with a suitable carrier, can also be formulated as tablets. Such carriers must be compatible with the active ingredient and can be the carriers mentioned for use with capsules, or can be such binders or fillers as cornstarch, acacia, gelatin, or cellulosic materials. Generally, any of the tableting materials conventionally used in pharmaceutical practice can be employed if there is no incompatibility with the active ingredient.

The tablets are made by admixing the active ingredient, a suitable filler, a lubricant or mold-release agent, and a binder, and compressing the mixture in a conventional tableting machine into tablets of a preselected size. Preferably, each tablet will contain from 50 to 250 milligrams of active ingredient. The tablets can be scored so that they are easily broken. Optionally, the tablets can be coated with tablet-coating materials in order to make them more attractive and palatable. They can also have enteric coatings so that they will release their ingredients slowly and over a longer period.

The compounds of Formula 1 can also be formulated and administered as suspensions or syrups. The anticonvulsant compound is usually present in such suspensions and syrups in amounts of from 1% to 5% by weight, however, lower or higher concentrations can be used.

The pharmaceutical carrier in such suspensions or syrups can be an aqueous vehicle such as an aromatic water, a syrup, or a pharmaceutical mucilage. Suitable aromatic waters include the following:

Anise Water, N.F. (IX)
Bitter Almond Water, N.F. (VIII)
Camphor Water, N.F.
Cinnamon Water, U.S.P.
Fennel Water, N.F.
Peppermint Water, U.S.P.
Spearmint Water, N.F. (IX)
Wintergreen Water, N.F. (IX)

Suitable syrups include the following:

Syrup (Simple Syrup), U.S.P.
Acacia Syrup, U.S.P.
Aromatic Eriodictyon Syrup, N.F.
Aromatic Rhubarb Syrup, N.F. (IX)
Cacao Syrup, U.S.P.
Cherry Syrup, U.S.P.
Cinnamon Syrup, N.F. (IX)
Citric Acid Syrup, U.S.P.
Compound Sarsparilla Syrup, N.F.
Compound White Pine Syrup, N.F.
Ginger Syrup, N.F. (IX)
Glycyrrhiza (Licorice) Syrup, U.S.P.
Orange Syrup, U.S.P.
Orange Flower Syrup, N.F.
Raspberry Syrup, U.S.P.
Rhubarb Syrup, N.F. (IX)
Tolu Balsam Syrup, U.S.P.
Wild Cherry Syrup, U.S.P.

Suitable pharmaceutical mucilages include the following:

Acacia (Gum Arabic), U.S.P.
Acacia Mucilage, U.S.P.
Tragacanth, U.S.P.
Tragacanth Mucilage, N.F.

The pharmaceutical carrier in the suspensions or syrups can also be a hydroalcoholic vehicle, such as an elixir. Suitable elixirs include the following:

Aromatic Elixir, U.S.P.
Red Aromatic Elixir, N.F.
Glycyrrhiza Elixir, N.F.
Iso-Alcoholic Elixir (Iso-Elixir), N.F.

Coloring agents, tinctures, spirits, and other adjuvants can be admixed with the composition if desired.

The compounds of Formula 1 are prepared by the action of properly substituted benzoyl chlorides upon ammonia or properly selected aliphatic amines, according to the following typical equations:

(4)

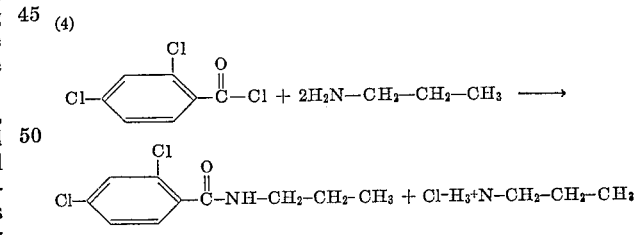

This equation and those which follow show the reaction of specific reagents to yield specific compounds. It should be understood that this is for illustration only and that the other compounds of Formula 1 are prepared similarly, with the exception of the polyhalogenated benzimides derived from "hydroxymethylamine" and "alkoxymethylamines," whose preparation will be described later.

In Equation 4 the 2,3,6-trichlorobenzoyl chloride reacts with the isobutylamine to yield 2,3,6-trichloro-N-isobutylbenzamide.

The reaction can be run in either aqueous or organic media, under a variety of conditions. To obtain complete reaction and optimum yield of product, a means must be provided for absorbing the one mole of hydrochloric acid which is liberated for each mole of product formed. This is most conveniently done by using at least two moles of the amine per mole of acid chloride in the reaction, the second mole of amine serving to remove the hydrochloric acid through formation of the amine hydrochloride. If this were not done, the product would still be formed, but in diminished yield.

The most convenient method of preparing these compounds involves the use of water as the reaction medium, with two moles or more of amine present per mole of acid chloride. According to this method, the reactants are simply stirred together at the appropriate temperature. At the end of reaction, the product separates, usually as a crystalline solid, but occasionally as a viscous oil. It can then be filtered, separated, or extracted in substantially pure form. The water-soluble amine hydrochloride remains behind, dissolved in the reaction mixture.

Reaction temperatures can range from about $-5°$ C. to $-10°$ C., the freezing point of the aqueous medium, up to about 70° C. to 80° C. The majority of reactions are conducted at from about $-5°$ C. to $-10°$ C. to 40° C. to 45° C. to avoid hydrolysis of the acid chloride. Those acid chlorides which have halogen substituents in the 2 and 6 positions of the phenyl ring, the "hindered" acid chlorides, are uncommonly stable to aqueous hydrolysis, and with these reactants higher temperatures can be used. There is usually no need for reaction temperatures above 45° C., as sufficient driving force is present to cause complete reaction in periods of 1 to 2 hours at this temperature.

In general, reaction periods of 1 to 2 hours at $-5°$ C. to 45° C. are used. In the case of incomplete reaction under these conditions, however, periods as long as 24 to 48 hours can be used. When "hindered" acid chlorides are used as reactants, higher temperatures can be used for 1 to 2 hours, or in extreme cases, for 24 to 48 hours.

Because the reaction is run to completion, the nearly water-insoluble acid chloride is consumed and does not contaminate the product. Although it is possible to use an amine which is insoluble or slightly soluble, a slight or deliberate excess of such an amine over the amount needed to remove the hydrochloric acid will contaminate the final product, making its purification tedious. Thus, in cases where a water-insoluble amine is used, or where a sparingly soluble amine is used in an amount exceeding its solubility at the completion of the reaction, it is convenient to use one mole of the amine plus one or more moles of a fairly water-soluble tertiary amine such as triethylamine, or a weak alkali such as sodium bicarbonate, potassium bicarbonate, sodium carbonate, or potassium carbonate. Tertiary amines cannot form amides, and serve to trap the hydrochloric acid formed. If this is not done, the final product can be freed of residual insoluble amine by a means like washing or extracting with aqueous acid.

When the amine used is slightly soluble or insoluble in water, it is preferable to use a suitable organic medium instead of water. This promotes rapid reaction because both the amine and the acid chloride are soluble in organic solvents. Inert reaction solvents such as ether, dioxane, benzene, toluene, hexane, heptane, or petroleum ether can be used, provided they do not react with the acid chloride or the amine. Alcohols can be used, but form contaminating esters with the acid chloride and their use is therefore inadvisable.

A broad range of temperatures can be used with organic media, limited only by the freezing and boiling points of the solvent. In general, however, it is not necessary to use temperatures outside the range of $-25°$ C. to 50° C. The reaction usually proceeds at room temperature.

The reaction period can be from 24 to 48 hours, but is usually 1 to 6 hours.

When an inert organic solvent is used, a mixture of amide and amine hydrochloride separates after reaction, or only the amine hydrochloride separates. If a mixture separates, it is filtered, freeing it of solvent and excess amine. The filtered material is then washed with water to obtain substantially pure amide. If only the amine hydrochloride separates, the reaction mixture is extracted with dilute mineral acid to remove the amine hydrochloride and excess amine, and the amide is obtained by concentrating the organic layer.

When certain of the inert solvents having high boiling points, such as benzene, toluene, xylene, or mineral oil, are used, it is possible to obtain complete reaction of one mole of acid chloride with one mole of amine if the reaction mixture is refluxed. When this is done, hydrogen chloride is liberated and escapes through the reflux condenser. No amine hydrochloride remains at the end of reaction. Reflux temperatures can range from about 80° C. to 250° C., depending on the solvent used. The mixture is refluxed for 1 to 8 hours, or until it becomes clear, which usually takes no longer than 24 to 48 hours. The product crystallizes on cooling or is isolated by concentration.

In many reactions, the medium need not be inert to the acid chloride. An excess of the amine reactant can be used, or the medium can be a tertiary amine such as triethylamine, pyridine, or 2,6-lutidine. Only one mole of the amine reactant need be used. In either case, reaction temperatures can vary from the freezing point of the solvent to its reflux temperature. Generally, however, temperatures of from 20° C. to 100° C. are used. In most cases, the reaction will proceed at a satisfactory rate if the reaction mixture is allowed to stand at room temperature. High temperatures favor dibenzoylation of the amine and are to be avoided unless necessary. The dibenzoylation, however, is not a serious side reaction. The amide products are isolated by cooling and filtering, with water-washing if necessary. The amide can also be isolated by extracting it with an immiscible solvent such as ether, and then removing the solvent by evaporation.

When excess amine or tertiary amine solvents are used, the reaction is promoted by the formation of a benzoyl-ammonium chloride intermediate which can itself form an amide. This is illustrated by the following typical equation:

(5)

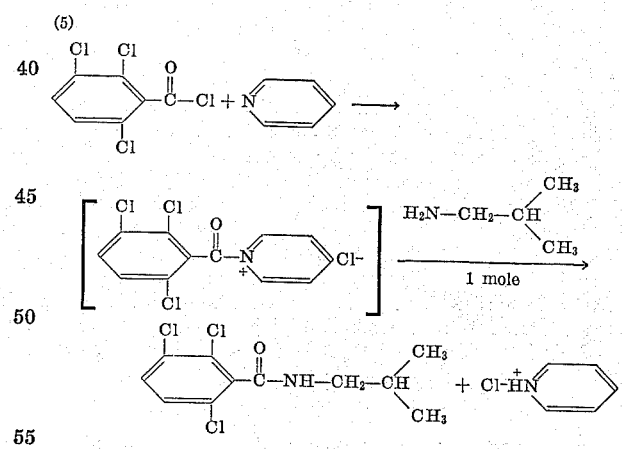

When amides derived from "hydroxymethylamine" or "alkoxymethylamines" are prepared, the reaction of Equation 4 is inapplicable because the corresponding amines are not stable. These amides are prepared by alkylating a preformed primary amide with formaldehyde or paraformaldehyde as illustrated by the following typical equations:

(6)

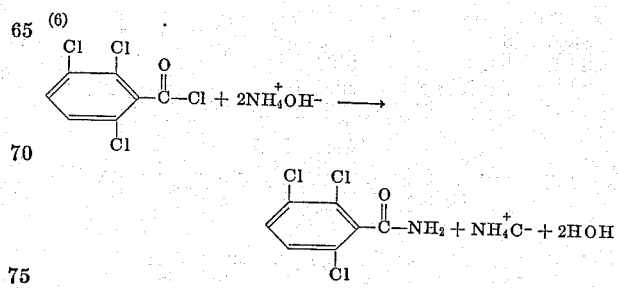

(7)
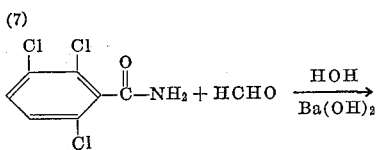

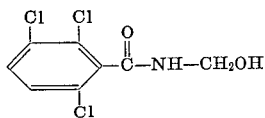

The polyhalobenzamide is prepared from the proper acid chloride by reacting the chloride with aqueous ammonium hydroxide under the conditions previously described for reactions in an aqueous medium. The resulting benzamide is then refluxed for from 5 minutes to 2 hours with about 1 liter of a 5%–40% Formalin solution per mole of amide, which solution also contains about 10 grams of barium hydroxide per mole of amide. The amide usually crystallizes on cooling. Occasionally it is necessary to neutralize the barium hydroxide with sulfuric acid, filter the barium sulfate, and isolate the amide by concentration of the filtrate in vacuo.

Alkoxymethyl amides can be prepared according to the following typical equation:

(8)
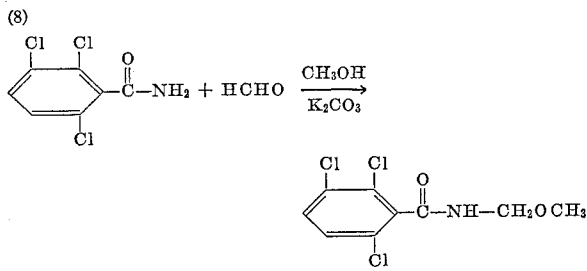

A mixture of one mole of the amide, prepared as in Equation 6, with about 1.5 moles of paraformaldehyde and 10 grams of potassium or sodium carbonate per mole of amide in about 1.5 liters of absolute methanol per mole of amide is refluxed for from 30 minutes to 6 hours. The preferred time is about 1 to 3 hours. The amide usually crystallizes on cooling or on cooling and concentration.

In this reaction, the alkyl portion of the alkoxy grouping on the amide is derived from the alcohol used as the reaction medium. For example, if a butoxymethyl substituent is desired, about 1.5 liters of absolute butanol are substituted for the methanol used in Equation 8.

This invention will be better understood by referring to the following illustrative examples:

EXAMPLE 1

Several No. 3 hard gelatin capsules are filled with 250 milligrams of 2,3,6-trichlorobenzamide, 22 milligrams of lactose, and 3 milligrams of calcium stearate. One to four of these capsules, given orally every day, will control convulsive seizures for extended periods.

EXAMPLE 2

Tablets containing 250 milligrams of 2,6-dichloro-N-(3-hydroxypropyl)benzamide are prepared by binding the active material with a 15% gelatin solution, then granulating and drying the resulting mixture. This mixture is screened and lubricated with 3% by weight of talc and 3% by weight of dried starch. The resulting granules are tableted in conventional equipment.

EXAMPLE 3

A flavored suspension is prepared by dissolving 5 parts of o-chloro-N-methylbenzamide in 10 parts of ethanol and then adding the solution to 90 parts of acacia syrup. A teaspoonful of the resulting suspension contains 250 milligrams of active ingredient.

The following benzamides can be formulated as in Examples 1, 2 and 3 by using equivalent amounts of the listed compounds:

Benzamide
o-Chlorobenzamide
m-Chlorobenzamide
p-Chlorobenzamide
2,3-dichlorobenzamide
2,4-dichlorobenzamide
2,5-dichlorobenzamide
2,6-dichlorobenzamide
3,4-dichlorobenzamide
3,5-dichlorobenzamide
2,3,4-trichlorobenzamide
2,3,5-trichlorobenzamide
2,3,6-trichlorobenzamide
2,4,5-trichlorobenzamide
2,4,6-trichlorobenzamide
3,4,5-trichlorobenzamide
2,3,4,5-tetrachlorobenzamide
2,3,4,6-tetrachlorobenzamide
2,3,5,6-tetrachlorobenzamide
Pentachlorobenzamide
o-Fluorobenzamide
p-Fluorobenzamide
2,4-difluorobenzamide
2,6-difluorobenzamide
3,5-difluorobenzamide
2,3,5-trifluorobenzamide
2,4,5-trifluorobenzamide
3,4,5-trifluorobenzamide
2,3,4,6-tetrafluorobenzamide
Pentafluorobenzamide
m-Bromobenzamide
2,3-dibromobenzamide
2,5-dibromobenzamide
3,4-dibromobenzamide
2,3,4-tribromobenzamide
2,3,6-tribromobenzamide
2,4,6-tribromobenzamide
2,3,4,5-tetrabromobenzamide
2,3,5,6-tetrabromobenzamide
2-chloro-4-fluorobenzamide
4-chloro-2-fluorobenzamide
3-chloro-4-fluorobenzamide
2,6-dichloro-4-fluorobenzamide
3,4-dichloro-2-fluorobenzamide
4-chloro-2,6-difluorobenzamide
2,3,6-trichloro-5-fluorobenzamide
5-chloro-2,3,6-trifluorobenzamide
2,6-dichloro-3,4-difluorobenzamide
2,3,5,6-tetrachloro-4-fluorobenzamide
4-chloro-2,3,5,6-tetrafluorobenzamide
2,3,6-trichloro-4,5-difluorobenzamide
4,5-dichloro-2,3,6-trifluorobenzamide
4-bromo-2-chlorobenzamide
4-bromo-2,6-dichlorobenzamide
2-bromo-4,5-dichlorobenzamide
2,6-dibromo-4-chlorobenzamide
3,4-dibromo-2,6-dichlorobenzamide
4,5-dibromo-2,3,6-trichlorobenzamide
2-bromo-4-fluorobenzamide
4-bromo-2,6-difluorobenzamide
2,6-dibromo-4-fluorobenzamide
2,6-dibromo-3,4-difluorobenzamide
N-methylbenzamide
o-Chloro-N-ethylbenzamide
m-Chloro-N-propylbenzamide
p-Chloro-N-butylbenzamide
2,3-dichloro-N-isobutylbenzamide
2,4-dichloro-N-(2-hydroxyethyl)benzamide
2,5-dichloro-N-(2-hydroxypropyl)benzamide
2,6-dichloro-N-(3-hydroxypropyl)benzamide
3,4-dichloro-N-methylbenzamide 3,4-dichloro-N-(2-hydroxybutyl)benzamide
3,5-dichloro-N-(3-hydroxybutyl)benzamide
o-Fluoro-N-(4-hydroxybutyl)benzamide
m-Fluoro-N-(2-hydroxy-2-methylpropyl)benzamide
p-Fluoro-N-(3-hydroxy-2-methylpropyl)benzamide
2,3-difluoro-N-(2-methoxyethyl)benzamide
2,4-difluoro-N-(2-ethoxyethyl)benzamide
2,5-difluoro-N-(2-methoxypropyl)benzamide
2,6-difluoro-N-(3-methoxypropyl)benzamide
3,4-difluoro-N-(2-methoxybutyl)benzamide
3,5-difluoro-N-(4-methoxybutyl)benzamide
o-Bromo-N-(4-methoxy-2-methylpropyl)benzamide
2,3-dichloro-N-sec.-butylbenzamide
2,4-dichloro-N-(2-hydroxy-1-methylpropyl)benzamide
2,6-difluoro-N-(2-methoxyethyl)benzamide
3,4-difluoro-N-(2-ethoxyethyl)benzamide
o-Chloro-N-amylbenzamide
m-Chloro-N-isoamylbenzamide
2,3-dichloro-N-(2-methylbutyl)benzamide
o-Chloro-N-hydroxymethylbenzamide
p-Chloro-N-methoxymethylbenzamide
o-Chloro-N-ethoxymethylbenzamide
2,3-dichloro-N-isopropoxymethylbenzamide
2-chloro-4-fluoro-N-isobutoxymethylbenzamide

EXAMPLE 4

A flavored syrup is prepared by dissolving 2 parts of 2,4-dichloro-N-(2-hydroxyethyl)benzamide in 98 parts of hot water, and then diluting this with an equal quantity of orange syrup. The resulting preparation contains 50 milligrams of active ingredient per teaspoonful.

EXAMPLE 5

An elixir of 2,5-dichloro-N-(2-hydroxypropyl)benzamide is made by dissolving 2 parts of the compound in 20 parts of alcohol. This alcoholic solution is diluted with 37.5 parts of orange syrup and enough water to make 100 parts. Each teaspoonful of the elixir contains 100 milligrams of active ingredient.

EXAMPLE 6

An injectable solution of 2,5-dibromo-N-(2-diethylaminoethyl)benzamide is prepared by dissolving 5 parts of the compound in enough water or saline solution containing 0.48 part of hydrochloric acid to make 100 parts of solution. Alternatively, an injectable solution is prepared by dissolving 5.47 parts of 2,5-dibromo-N-(2-diethylaminoethyl)benzamide hydrochloride in enough water or isotonic saline solution to make 100 parts of solution. The resulting solution is dispensed into small vials, capped, and sterilized by autoclaving at 121° C. for from 5 to 15 minutes.

The following compounds can be formulated as in Examples 4, 5 or 6 by using the listed benzamides, in equivalent amounts:

3,4-dibromo-N-[2-(1-pyrrolidinyl)ethyl]-benzamide
3,5-dibromo-N-[2-(1-piperidinyl)ethyl]-benzamide
2-chloro-4-fluoro-N-[2-(1-piperazinyl)-ethyl]benzamide
4-bromo-2-chloro-N-(2-morpholinoethyl)-benzamide
2-bromo-4-fluoro-N-[2-[(2-methyl)piperidinyl]ethyl]benzamide
m-Bromo-N-(2-aminoethyl)benzamide
p-Bromo-N-(3-aminopropyl)benzamide
2,3-dibromo-N-(4-aminobutyl)benzamide
2,4-dibromo-N-(2-dimethylaminoethyl)-benzamide
2,5-dibromo-N-(2-diethylaminoethyl)-benzamide
2,6-dibromo-N-(2-ethylaminoethyl)-benzamide The compositions of Examples 2–6 will, as the composition of Example 1, control convulsive seizures for extended periods.

EXAMPLE 7

Male white Swiss mice are given 2,3,6-trichloro-N-propylbenzamide by oral intubation at levels of 21.5 mg./kg., 46.4 mg./kg., 100 mg./kg., and 215 mg./kg., 30 minutes before a challenge with a maximal electroshock of 50 ma. for 0.3 second. The shock is administered through corneal electrodes using the apparatus of Woodbury and Davenport, described in Arch. of International Pharmacodynamics, 92, 97 (1952). Five mice are used at each dose level. The hind leg extensor response is used as the criterion of activity.

The average $ED_{50}$ is found to be 51 mg./kg.

EXAMPLE 8

*Preparation of 2,3,5-trichloro-N-methylbenzamide in aqueous medium, amine in excess*

Twenty-five milliliters of 40% methylamine in water, contained in an Erlenmeyer flask, are stirred in an ice-water bath until the temperature reaches 10° C. To this solution is added 3.75 grams of 2,3,5-trichlorobenzoyl chloride and the mixture is stirred for 1 hour. The ice-water bath is removed, 25 milliliters of water are added to increase fluidity and to decrease the solubility of the amide in the concentrated amine solution, and the mixture is stirred an additional hour at room temperature. The resulting nearly colorless crystalline solid is filtered, washed with three 25-milliliter portions of water, and dried. This solid is then taken up in 35 milliliters of boiling benzene, filtered hot, concentrated to 25 milliliters by boiling, and allowed to cool to room temperature and stand overnight. The resulting crystals are filtered and dried. An additional recrystallization from 20 milliliters of benzene, omitting the hot filtration, gives 2.70 grams of colorless, hairlike needles of 2,3,5-trichloro-N-methylbenzamide, which melt at 134.5–136° C.

The compounds listed in the following table can be made according to the method of this example, by substituting 25 milliliters of the amine listed and 3.75 grams of the properly substituted polychlorobenzoyl chloride for the methylamine and 2,3,5-trichlorobenzoyl chloride used in Example 8.

| Compound | Melting Point, ° Centigrade | Amine | Recrystallized from— |
|---|---|---|---|
| 2,3,6-trichloro-N-methylbenzamide | 191–192 | 40% methylamine | Benzene. |
| 2,3,6-trichloro-N-ethylbenzamide | 156–157 | 50% ethylamine | 1:1 benzene-Skellysolve B.[1] |
| 2,3,6-trichloro-N-propylbenzamide | 134.5–136 | 50% propylamine | Do. |
| 2,3,6-trichloro-N-isopropylbenzamide | 174.5–176 | 50% isopropylamine | Benzene. |
| 2,3,6-trichloro-N-butylbenzamide | 98–100.5 | 20% butylamine | 1:5 benzene-Skellysolve B. |
| 2,3,6-trichloro-N-isobutylbenzamide | 149.5–151 | 40% isobutylamine | 3:1 benzene-Skellysolve B. |
| 2,3,6-trichloro-N-sec.-butylbenzamide | 169–170.5 | 50% sec.-butylamine | 2:1 benzene-Skellysolve B. |
| 2,4,5-trichloro-N-methylbenzamide | 143.5–145 | 40% methylamine | Benzene. |
| 2,4,6-trichloro-N-methylbenzamide | 183–184.5 | do | Do. |
| 2,3,4,5-tetrachloro-N-methylbenzamide | 171.5–172.5 | do | Do. |
| 2,3,5,6-tetrachloro-N-methylbenzamide | 221–222 | do | Do. |
| 2,3,6-trichloro-N-(2-hydroxyethyl)benzamide | 125.5–126.5 | 50% 2-hydroxyethylamine | Do. |
| 2,3,6-trichloro-N-(2-hydroxypropyl)benzamide | 75–80 | 50% 2-hydroxypropylamine | Do. |
| 2,3,6-trichloro-N-(3-methoxypropyl)benzamide | 60–61 | 20% 3-methoxypropylamine | 7:11 ether-Skellysolve B. |

[1] Skellysolve B is a mixture of hydrocarbons, predominantly n-hexane.

EXAMPLE 9

*Preparation of 2,3,4-trichloro-N-propylbenzamide in aqueous medium, one mole of amine plus tertiary amine or alkali carbonate*

This compound is prepared according to the method of Example 8, except that a mixture of 0.59 gram of propylamine, 7.29 grams of triethylamine, and 15 grams of water are used instead of the methylamine, and that 2.44 grams of 2,3,4-trichlorobenzoyl chloride are used instead of the 2,3,5-trichlorobenzoyl chloride. The crystalline solid is recrystallized from a 1:1 mixture of benzene and Skellysolve B.

The compounds listed in the following table can also be prepared according to the method of this example by substituting the benzoyl chlorides and amines listed for the propylamine and 2,3,4-trichlorobenzoyl chloride.

EXAMPLE 11

*Preparation of 2,3,6-trichloro-N-(2-aminoethyl)-benzamide in an excess of amine*

A 2.44-gram quantity of 2,3,6-trichlorobenzoyl chloride is added dropwise to 25 grams of ethylene diamine with stirring, over a 30-minute period. Stirring is continued for 1 hour. The excess ethylene diamine is then removed by concentration in vacuo in a 75° C. bath. Twenty-five milliliters of 5% sodium hydroxide are added, and the mixture is then extracted with three 50-milliliter portions of ether. The ether extracts are combined, washed with 25 milliliters of water, dried with anhydrous magnesium sulfate, and concentrated in vacuo in a 40° C. bath to yield the desired compound as a pale yellow, viscous oil.

PARTS BY WEIGHT OF ACID CHLORIDE AND AMINE TO REACT IN 7.29 PARTS TRIETHYLAMINE AND 15 PARTS WATER

| Acid Chloride | Parts by Weight | Amine | Parts by Weight | Product |
|---|---|---|---|---|
| 3,4,5-trichlorobenzoyl chloride | 2.44 | Butylamine | 0.73 | 3,4,5-trichloro-N-butylbenzamide. |
| 2,3,4,6-tetrachlorobenzoyl chloride | 2.79 | Isobutylamine | 0.73 | 2,3,4,6-tetrachloro-N-isobutylbenzamide. |
| Pentachlorobenzoyl chloride | 3.13 | Propylamine | 0.59 | Pentachloro-N-propylbenzamide. |
| 2,3,4-trifluorobenzoyl chloride | 1.95 | ____do____ | 0.59 | 2,3,4-trifluoro-N-propylbenzamide. |
| 2,3,5-trifluorobenzoyl chloride | 1.95 | Butylamine | 0.73 | 2,3,5-trifluoro-N-butylbenzamide. |
| 2,3,6-trifluorobenzoyl chloride | 1.95 | Isobutylamine | 0.73 | 2,3,6-trifluoro-N-isobutylbenzamide. |
| 2,4,6-trifluorobenzoyl chloride | 1.95 | 2-hydroxyethylamine | 0.61 | 2,4,6-trifluoro-N-(2-hydroxyethyl)benzamide. |
| 2,4,5-trifluorobenzoyl chloride | 1.95 | 2-hydroxypropylamine | 0.75 | 2,4,5-trifluoro-N-(2-hydroxypropyl)benzamide. |
| 3,4,5-trifluorobenzoyl chloride | 1.95 | 3-hydroxypropylamine | 0.75 | 3,4,5-trifluoro-N-(3-hydroxypropyl)benzamide. |
| 2,3,4,5-tetrafluorobenzoyl chloride | 2.13 | 2-hydroxy-2-methylpropylamine | 0.89 | 2,3,4,5-tetrafluoro-N-(2-hydroxy-2-methylpropyl)-benzamide. |
| Do | 2.13 | 3-hydroxy-2-methylpropylamine | 0.89 | 2,3,4,5-tetrafluoro-N-(3-hydroxy-2-methylpropyl)-benzamide. |
| 2,3,4,6-tetrafluorobenzoyl chloride | 2.13 | 2-hydroxybutylamine | 0.89 | 2,3,4,6-tetrafluoro-N-(2-hydroxybutyl)-benzamide. |
| 2,3,5,6-tetrafluorobenzoyl chloride | 2.13 | 3-hydroxybutylamine | 0.89 | 2,3,5,6-tetrafluoro-N-(3-hydroxybutyl)-benzamide. |
| Pentafluorobenzoyl chloride | 2.30 | 4-hydroxybutylamine | 0.89 | Pentafluoro-N-(4-hydroxybutyl)benzamide. |

Other compounds prepared by this procedure are given in the following table:

PARTS BY WEIGHT OF ACID CHLORIDE TO REACT WITH 25 PARTS OF AMINE

| Acid Chloride | Parts by Weight | Amine | Product |
|---|---|---|---|
| 2,4,6-trichlorobenzoyl chloride | 2.44 | 1,2-diaminopropane | 2,4,6-trichloro-N-(2-aminopropyl)-benzamide. |
| 2,4,5-trichlorobenzoyl chloride | 2.44 | N,N-dimethylethylene diamine | 2,4,5-trichloro-N-(2-dimethylaminoethyl)benzamide. |
| 2,3,4,5-tetrachlorobenzoyl chloride | 2.79 | 1-amino-2-(dimethylamino) propane | 2,3,4,5-tetrachloro-N-[2-(dimethylamino)propyl]-benzamide. |
| 2,3,5,6-tetrachlorobenzoyl chloride | 2.79 | N-ethyl-ethylene diamine | 2,3,5,6-tetrachloro-N-(2-ethylaminoethyl)benzamide. |
| 2,3,4,6-tetrachlorobenzoyl chloride | 2.79 | Propylamine | 2,3,4,6-tetrachloro-N-propylbenzamide. |

EXAMPLE 10

*Preparation of 2,3,6-trichloro-N-butylbenzamide in an inert organic medium at reflux, one mole of amine*

To a solution of 12.2 grams of 2,3,6-trichlorobenzoyl chloride in 50 milliliters of toluene are added 3.65 grams of butylamine. The mixture is refluxed until the cloudiness which develops on mixing disappears, which takes about 2 hours. The mixture is allowed to cool slowly to room temperature, and 100 milliliters of Skellysolve B are added. The colorless crystals of 2,3,6-trichloro-N-butylbenzamide which separate are filtered and dried. These crystals have a melting point of 98–100.5° C.

Other compounds prepared by this procedure are given in the following table:

EXAMPLE 12

*Preparation of 2,3,6-trichloro-N-(2-dimethylaminoethyl) benzamide in a tertiary amine*

A 2.44-gram quantity of 2,3,6-trichlorobenzoyl chloride is added dropwise, with stirring, to a solution of 0.88 gram of N,N-dimethylethylenediamine in 25 grams of triethylamine over a 30-minute period. Stirring is continued for one hour. The triethylamine is then removed by concentration in vacuo in a 75° C. bath. Twenty-five milliliters of 5% sodium hydroxide are then added, and the mixture is extracted with three 50-milliliter portions of ether. The ether extracts are combined, washed with 25 milliliters of water, dried with anhydrous magnesium sulfate, and con-

PARTS BY WEIGHT OF ACID CHLORIDE TO REACT WITH PARTS OF AMINE IN 45 PARTS MEDIUM

| Acid Chloride | Parts by Weight | Amine | Parts by Weight | Medium | Product |
|---|---|---|---|---|---|
| 4-bromo-2,6-dichlorobenzoyl chloride | 14.4 | Propylamine | 2.95 | Benzene | 4-bromo-2,6-dichloro-N-propylbenzamide. |
| 2-bromo-4,5-dichlorobenzoyl chloride | 14.4 | Isobutylamine | 3.66 | Toluene | 2-bromo-4,5-dichloro-N-isobutylbenzamide. |
| 4-bromo-2,6-difluorobenzoyl chloride | 12.8 | Propylamine | 2.95 | Benzene | 4-bromo-2,6-difluoro-N-propylbenzamide. |
| 2,6-dibromo-4-fluorobenzoyl chloride | 15.8 | Butylamine | 3.66 | Toluene | 2,6-dibromo-4-fluoro-N-butylbenzamide. |
| 2,6-dibromo-3,4-difluorobenzoyl chloride | 16.7 | Isobutylamine | 3.66 | Xylene | 2,6-dibromo-3,4-difluoro-N-isobutylbenzamide. | centrated in vacuo in a 40° C. bath to yield the desired compound as a pale yellow viscous oil.

Other compounds prepared by this procedure are given in the following table:

Two and twenty-four one-hundredths grams of this recrystallized 2,3,6-trichlorobenzamide are refluxed 1 hour with a solution of 0.1 gram of barium hydroxide in 10 milliliters of 37% formalin. On cooling, crystals of 2,3,6-

PARTS BY WEIGHT OF ACID CHLORIDE TO REACT WITH PARTS OF AMINE IN 25 PARTS MEDIUM

| Acid Chloride | Parts by Weight | Amine | Parts by Weight | Medium | Product |
|---|---|---|---|---|---|
| 2,4,5-trichlorobenzoyl chloride | 2.44 | N-(2-aminoethyl)-pyrrolidine | 1.14 | Triethylamine | 2,4,5-trichloro-N-[2-(1-pyrrolidinyl)-ethyl]-benzamide. |
| 3,4,5-trichlorobenzoyl chloride | 2.44 | N-(2-aminoethyl)-piperidine | 1.28 | do | 3,4,5-trichloro-N-[2-(1-piperidinyl)-ethyl]-benzamide. |
| 2,3,4,5-tetrachlorobenzoyl chloride | 2.79 | N-(2-aminoethyl)-piperazine | 1.29 | Pyridine | 2,3,4,5-tetrachloro-N-[2-(1-piperazinyl)-ethyl]-benzamide. |
| 2,3,5,6-tetrachlorobenzoyl chloride | 2.79 | N-(2-aminoethyl)-morpholine | 1.30 | Triethylamine | 2,3,5,6-tetrachloro-N-(2-morpholinoethyl)-benzamide. |
| Pentachlorobenzoyl chloride | 3.13 | N-(2-aminoethyl)-1-methyl piperidine. | 1.42 | Pyridine | Pentachloro-N-[2-(1-(2-methyl) piperidinyl)ethyl] benzamide. |

EXAMPLE 13

*Preparation of 2,3,6-trichloro-N-(2-diethylaminoethyl) benzamide*

A solution of 20 grams of N,N-diethylethylene diamine in 50 milliliters of water is stirred and cooled in an ice-water bath. Then 9.0 grams of 2,3,6-trichlorobenzoyl chloride are added dropwise, with stirring, over a 15-minute period. The mixture is stirred 1 hour, the ice bath is removed, and stirring is continued for an additional hour. The mixture is then extracted with 100 milliliters of ether, and the ether layer is washed with two 50-milliliter portions of water, dried with anhydrous magnesium sulfate, and concentrated to a yellow, viscous oil in vacuo in a 60° C. bath.

This oil is taken up in 50 milliliters of absolute ethanol, filtered, and a solution of 6.66 grams of oxalic acid in 15 milliliters of absolute ethanol is added, followed by 1.30 milliliters of ether (nearly to turbidity). The mixture is kept at 5° C. overnight. The crystals which form are then filtered and dried.

One recrystallization from a mixture of 50 milliliters of absolute ethanol and 85 milliliters of ether gives 5.6 grams of colorless crystals of 2,3,6-trichloro-N-(2-diethylaminoethyl)benzamide, oxalate which has a melting point of 127.5–129° C.

trichloro-N-hydroxymethylbenzamide separate and are filtered and dried.

Use of 2.59 grams of 2,3,4,6-tetrachlorobenzamide or 2.11 grams of pentafluorobenzamide in place of the 2,3,6-trichlorobenzamide gives 2,3,4,6-tetrachloro-N-hydroxymethylbenzamide and pentafluoro - N - hydroxymethylbenzamide, respectively.

EXAMPLE 15

*Preparation of 2,3,6-trichloro-N-methoxymethylbenzamide*

To a solution of 2.24 grams of 2,3,6-trichlorobenzamide, prepared according to the method outlined in Example 8, and 0.60 gram of paraformaldehyde in 15 milliliters of absolute methanol is added 0.1 gram of potassium carbonate. The mixture is refluxed 2 hours. It is then cooled, filtered, and concentrated to dryness in vacuo in a 30° C. bath. The residue is extracted with 50 milliliters of ether, washed with three 25-milliliter portions of water, dried wih anhydrous magnesium sulfate, and concentrated to a pale yellow oil in vacuo in a 40° C. bath. This oil crystallizes on standing overnight to give 2,3,6-trichloro-N-methoxymethylbenzamide.

Other compounds prepared by this procedure are given in the following table:

PARTS BY WEIGHT OF AMIDE TO REACT WITH 0.6 PART PARAFORMALDEHYDE AND 0.1 PART POTASSIUM CARBONATE IN 10 PARTS ALCOHOL

| Amide | Parts by Weight | Alcohol | Product |
|---|---|---|---|
| 2,3,5,6-tetrachlorobenzamide | 2.59 | Ethanol | 2,3,5,6-tetrachloro-N-ethoxymethylbenzamide. |
| Pentachlorobenzamide | 2.93 | Isopropyl alcohol | Pentachloro-N-isopropoxymethylbenzamide. |
| 2,6-dichloro-4-fluorobenzamide | 2.08 | Isobutyl alcohol | 2,6-dichloro-4-fluoro-N-isobutoxymethylbenzamide. |

A 5.5-gram portion of the oxalate is dissolved in 35 milliliters of water, and 20 milliliters of 5% sodium hydroxide are added. This mixture is extracted with 75 milliliters of ether. The ether extract is washed first with 25 milliliters of 5% sodium hydroxide, and then with two 25-milliliter portions of water. It is then dried with anhydrous magnesium sulfate and concentrated in vacuo in a 40° C. bath to a colorless, viscous oil, which crystallized on standing overnight. These crystals of 2,3,6-trichloro-N-(2-diethylaminoethyl)benzamide have a melting point of 56–58° C.

EXAMPLE 14

*Preparation of 2,3,6-trichloro-N-hydroxymethylbenzamide*

Thirty-five milliliters of 28% ammonium hydroxide are stirred and cooled in an ice-water bath. Then, 7.50 grams of 2,3,6-trichlorobenzoyl chloride are added dropwise, with stirring, over a 15-minute period, and the mixture is stirred 1 hour. The ice-water bath was removed, and the mixture is stirred an additional hour. The resulting crystals of 2,3,6-trichlorobenzamide are filtered, washed with 25 milliliters of water, and dried. These crystals are then recrystallized twice from benzene.

The embodiments of the invention in which an exclusive property or privilege is claimed are:

1. A method for the control of convulsive seizures, said method comprising administering to a warm-blooded animal subject to said seizures, in an amount sufficient to exert anticonvulsive activity, at least one compound of the formula

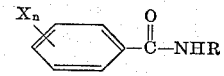

where

X is selected from the group consisting of hydrogen, fluorine, chlorine and bromine;

R is selected from the group consisting of primary alkyl containing from 1 to 5 carbon atoms, secondary alkyl containing from 3 to 5 carbon atoms, primary hydroxy alkyl containing from 2 to 5 carbon atoms, secondary hydroxy alkyl containing from 3 to 5 carbon atoms, primary methoxy alkyl where the alkyl contains from 2 to 5 carbon atoms, secondary methoxy alkyl where the alkyl contains from 3 to 5 carbon atoms, and Z—NR₁R₂ where Z is selected from the group consisting of methylene and ethylene, and R₁ and R₂ are selected from the group consisting of hydrogen and alkyl containing from 1 to 3 carbon atoms; and $n$ is a whole positive integer of 1 to 5.

2. A method for the control of convulsive seizures, said method comprising administering to a warm-blooded animal subject to said seizures, in an amount sufficient to exert anticonvulsive activity, at least one compound of the formula:

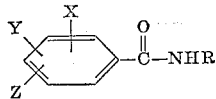

where X, Y, and Z are selected from the group consisting of chlorine and bromine; and R is selected from the group consisting of a primary alkyl, secondary alkyl, hydroxy alkyl, and alkoxy alkyl having 3 to 4 carbons.

3. The method of claim 2 wherein the compound being administered is 2,3,6-trichloro-N-propylbenzamide.

4. The method of claim 2 wherein the compound being administered is 2,3,6-trichloro-N-butylbenzamide.

5. The method of claim 2 wherein the compound being administered is 2,3,6-trichloro - N - (2-hydroxypropyl) benzamide.

6. The method of claim 2 wherein the compound being administered is 2,3,5-trichloro-N-propylbenzamide.

7. The method of claim 2 wherein the compound being administered is 2,4,6-trichloro-N-propylbenzamide.

8. The method of claim 2 wherein the compound being administered is 2,3,5-trichloro-N-(2-dimethylaminoethyl) benzamide.

References Cited
UNITED STATES PATENTS

| | | | |
|---|---|---|---|
| 2,233,296 | 2/1941 | Nelles | 260—558 |
| 2,415,356 | 2/1947 | Kellog | 260—558 |
| 2,461,509 | 2/1949 | Harvey | 260—558 |
| 2,785,200 | 3/1957 | Moore | 260—558 |
| 3,009,942 | 11/1961 | Klein et al. | 260—465 |

OTHER REFERENCES

Bottger et al.: USDA Bulletin No. E–789, U.S. Bureau of Entomology and Plant Quarantine, Agricultural Research Administration, U.S. Dept. of Agriculture, pp. 5, 8, 9, 11 and 12 (1949).

Thompson et al.: Chem. Abstracts, vol. 41, pp. 3902–12, p. 3907 relied upon (1947).

Joshi: Jour. Indian Chem. Soc., vol. 37, No. 7, (1960), pp. 423–424.

ALBERT T. MEYERS, *Primary Examiner.*

J. S. LEVITT, M. J. COHEN, S. J. FRIEDMAN,
*Assistant Examiners.*